United States Patent
Taki

(10) Patent No.: US 9,832,337 B2
(45) Date of Patent: Nov. 28, 2017

(54) IMAGE FORMING APPARATUS AND CONTROL METHOD OF IMAGE FORMING APPARATUS

(71) Applicant: KYOCERA Document Solutions Inc., Osaka (JP)

(72) Inventor: Kosuke Taki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/277,718

(22) Filed: Sep. 27, 2016

(65) Prior Publication Data
US 2017/0094096 A1    Mar. 30, 2017

(30) Foreign Application Priority Data
Sep. 30, 2015  (JP) ................................ 2015-193677

(51) Int. Cl.
*H04N 1/23*     (2006.01)
*H04N 1/387*    (2006.01)
*H04N 1/00*     (2006.01)

(52) U.S. Cl.
CPC ......... *H04N 1/233* (2013.01); *H04N 1/00827* (2013.01); *H04N 1/2323* (2013.01); *H04N 1/3872* (2013.01); *H04N 2201/0094* (2013.01)

(58) Field of Classification Search
CPC .. H04N 1/233; H04N 1/00827; H04N 1/2323; H04N 1/3872; H04N 2201/0094

USPC ......................................................... 358/1.2
See application file for complete search history.

(56) References Cited

U.S. PATENT DOCUMENTS

| | | | |
|---|---|---|---|
| 4,142,346 A * | 3/1979 | De Biasi | B65B 51/046 383/90 |
| 9,346,604 B2 * | 5/2016 | Thomas | B65D 77/02 |
| 2004/0105600 A1 * | 6/2004 | Floyd, Jr. | B65D 31/02 383/109 |
| 2007/0059477 A1 * | 3/2007 | Perelman | B32B 5/026 428/58 |
| 2012/0033903 A1 * | 2/2012 | Lisek | B65D 75/5855 383/200 |

FOREIGN PATENT DOCUMENTS

JP     2012-40850 A     3/2012

* cited by examiner

*Primary Examiner* — Allen H Nguyen
(74) *Attorney, Agent, or Firm* — Stein IP, LLC

(57) ABSTRACT

An image forming apparatus includes a printing portion, a receiving portion, an image reading portion for reading one surface and another surface connected to the one surface of a material to be housed, so as to generate individual image data of the one surface and the another surface, and a controlling portion configured to recognize a size of the material to be housed based on the individual image data, to generate paper bag image data that is image data of a development of the paper bag in which the entire of the material to be housed can fit, the development being with tabs for sticking for assembly, and to control the printing portion to print the development with tabs for sticking based on the paper bag image data.

15 Claims, 11 Drawing Sheets

IMAGE FORMING APPARATUS AND CONTROL METHOD OF IMAGE FORMING APPARATUS

INCORPORATION BY REFERENCE

This application is based upon and claims the benefit of priority from the corresponding Japanese Patent Application No. 2015-193677 filed Sep. 30, 2015, the entire contents of which are hereby incorporated by reference.

BACKGROUND

The present disclosure relates to an image forming apparatus such as a printer, a copier, a multifunction peripheral, or a facsimile device.

An image forming apparatus may be installed in a store. Using this image forming apparatus, a service of printing a photograph or a ticket may be available by paying a fee. There is known an embodiment of service using an image forming apparatus installed in a store, as follows.

Specifically, there is known a printing device, which determines the number of sheets for printing images, determines a size of a recording medium on which the images are printed, performs a print process of image data to print the images according to the determined number of sheets and the determined size, stores drawing data of a development of wrapping paper for wrapping a printed matter determined by the number of sheets and the size of the printed matter, edits the stored drawing data for wrapping the printed matter of the images with the wrapping paper according to the determined number of sheets and the determined size, performs a print process of the edited drawing data to print the development of the wrapping paper.

There is a case where a product or a present is put in a paper bag and is handed. Conventionally, in order to get a paper bag that corresponds to a size of a material to be housed such as a product or a present and has a desired design, it is necessary to have a meeting with a specialist to determine the size and the design, and to have the paper bag produced according to the meeting. In other words, it is necessary to do a special order. Such a special order is usually unacceptable unless at least a few hundreds of bags are ordered. Further, it is difficult to reduce a cost per one bag unless a large number of paper bags are ordered.

Conventionally, due to time and effort as well as a high cost, it is difficult to get a small number of paper bags with a desired size and design. Accordingly, unless a large budget is available, it is usual to search paper bags mass-produced by manufacturers to find one close to the desired size and design, and to buy it as a substitute. Conventionally, there is a problem that it is difficult to prepare an original (a desired) paper bag. Note that the conventional technique described above is related to wrapping paper and cannot solve the above-mentioned problem.

SUMMARY

An image forming apparatus according to an aspect of the present disclosure includes a receiving portion, an image reading portion, a controlling portion, and a printing portion. The receiving portion receives settings. The image reading portion reads one surface and another surface connected to the one surface of a material to be housed in a paper bag, so as to generate image data of the one surface and image data of the another surface. The controlling portion recognizes a size of the material to be housed based on the image data of the one surface and the image data of the another surface, and generates paper bag image data that is image data of a development of the paper bag in which the entire of the material to be housed can fit, the development being with tabs for sticking for assembly. The printing portion prints the development with tabs for sticking on a paper sheet based on the paper bag image data.

Further features and advantages of the present invention will become apparent from the description of embodiments given below.

DETAILED DESCRIPTION

Now, with reference to FIGS. 1 to 16, the present disclosure is described below. In view of the problem of the conventional technique described above, the present disclosure makes it possible to easily get desired paper bags for housing a solid body at a low cost even if a small number of them are needed. In this description, a multifunction peripheral 100 is exemplified as the image forming apparatus. However, elements such as structures and arrangements described in this embodiment are merely examples for description and should not be interpreted to limit the scope of the disclosure.

(Multifunction Peripheral 100)

Figure 1:
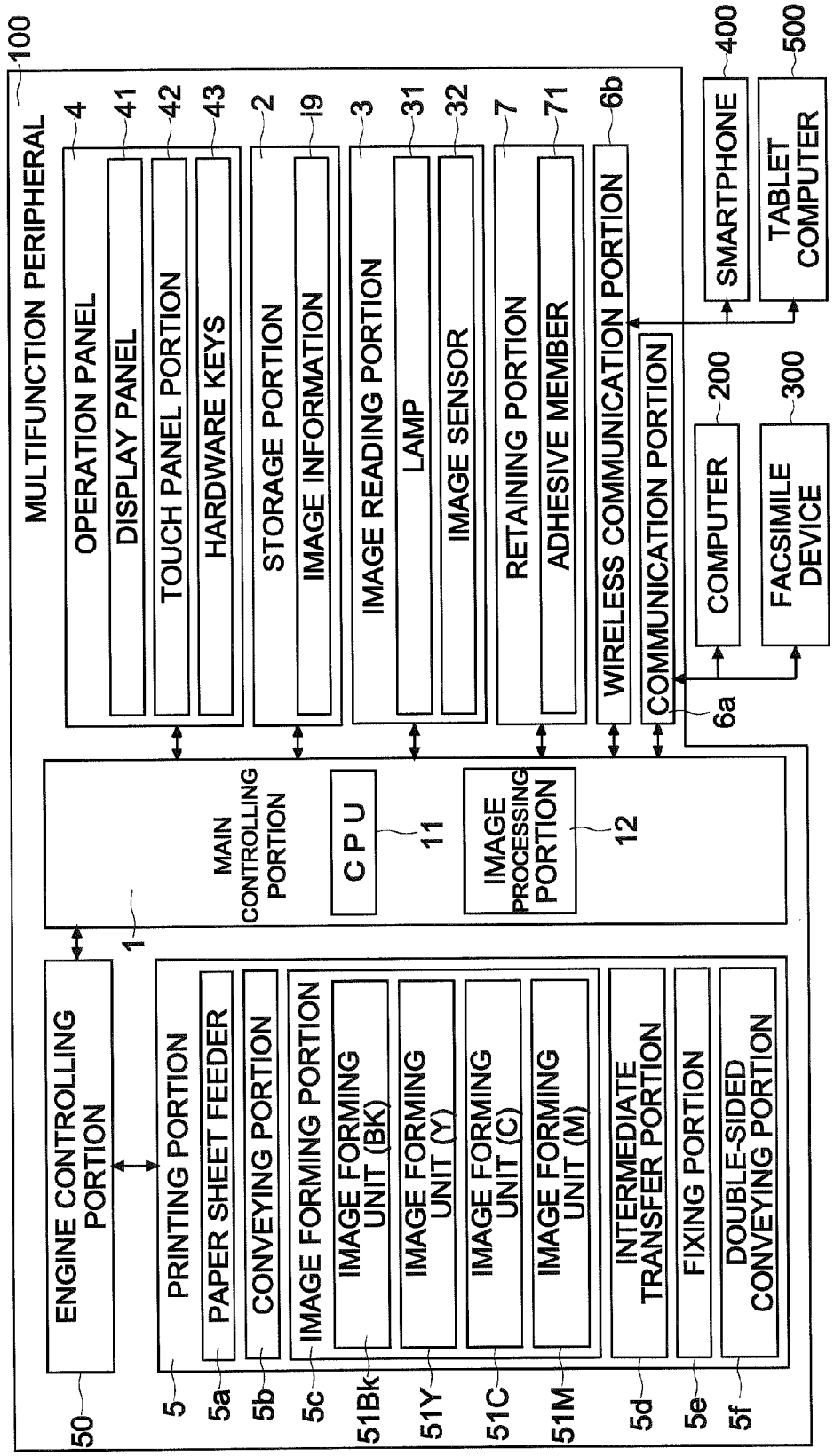
FIG. 1 is a diagram illustrating an example of a multi-function peripheral according to an embodiment.

With reference to FIG. 1, the multifunction peripheral 100 according to the embodiment is described. The multifunction peripheral 100 includes a main controlling portion 1 (corresponding to the controlling portion) and a storage portion 2. The main controlling portion 1 includes a circuit such as a CPU 11 and an image processing portion 12 so as to control operations of the multifunction peripheral 100. The storage portion 2 is a combination of a nonvolatile storage device such as a ROM and an HDD and a volatile storage device such as a RAM. The storage portion 2 stores various data such as various control programs and data, setting data, and image data. The CPU 11 performs control of individual portions of the multifunction peripheral 100 and various calculation processes based on the programs and data stored in the storage portion 2. The image processing portion 12 performs image processing such as density conversion, enlargement, reduction, rotation, and data format conversion on the image data to be used for printing and transmission. The image data after the processing is used for forming a toner image in an image forming portion 5c or transmission.

An image reading portion 3 includes a lamp 31 for emitting light to illuminate an object to be read such as a document placed on a document table (contact glass). In addition, the image reading portion 3 includes an image sensor 32 that receives reflection light from the object to be read so as to read the object to be read based on the reflection light. Further, the image reading portion 3 generates image data based on an output of the image sensor 32. The image reading portion 3 includes a document cover for pressing the document on the contact glass from above. The main controlling portion 1 is connected to the image reading portion 3 with a bus or a signal line. Further, the main controlling portion 1 controls an operation of the image reading portion 3 in a job such as scanning, printing, or transmission.

In addition, as illustrated in FIG. 1, the multifunction peripheral 100 includes an operation panel 4. The operation panel 4 includes a display panel 41. The display panel 41 displays a state of the multifunction peripheral 100, various messages, and various setting screens. A touch panel portion 42 (corresponding to the receiving portion) is disposed on a top surface of the display panel 41. The touch panel portion 42 detects a user's touch position so as to output a voltage (signal) corresponding to the detected position. The operation panel 4 also includes a plurality of hardware keys 43 (corresponding to the receiving portion) such as a start key and a ten-key.

The main controlling portion 1 controls display on the display panel 41. The main controlling portion 1 recognizes touch position (coordinates) on the display panel 41 (touch panel portion 42) based on an output of the touch panel portion 42 so as to recognize an image (such as a software key, a button, a tab, or a check box) that is operated. The main controlling portion 1 controls the display panel 41 to switch the display responding to the operation. The main controlling portion 1 controls operations of individual portions of the multifunction peripheral 100, such as the storage portion 2, the image reading portion 3 (corresponding to the input portion), a printing portion 5, a communication portion 6a (corresponding to the input portion), and a wireless communication portion 6b (corresponding to the input portion), so as to work according to user's settings when a job is executed.

The printing portion 5 (a paper sheet feeder 5a, a conveying portion 5b, the image forming portion 5c, an intermediate transfer portion 5d, a fixing portion 5e, a double-sided conveying portion 5f) performs printing on a paper sheet using toner based on the image data. An engine controlling portion 50 is disposed for controlling an operation of the printing portion 5. The engine controlling portion 50 performs an actual operation control of the printing portion 5 based on an instruction from the main controlling portion 1.

The paper sheet feeder 5a stores a plurality of paper sheets. In a print job, the engine controlling portion 50 controls the paper sheet feeder 5a to feed paper sheets one by one to the conveying portion 5b. The engine controlling portion 50 controls the conveying portion 5b to convey the paper sheet fed from the paper sheet feeder 5a. The engine controlling portion 50 controls the image forming portion 5c to form a toner image based on the image data.

The printing portion 5 supports color printing. The image forming portion 5c includes an image forming unit 51Bk for forming a black toner image, an image forming unit 51Y for forming a yellow toner image, an image forming unit 51C for forming a cyan toner image, and an image forming unit 51M for forming a magenta toner image. Individual image forming units 51 have the substantially same structure. In addition, the image forming portion 5c includes an exposure device (not shown). The exposure device exposes photosensitive drums disposed respectively in the image forming units. The engine controlling portion 50 controls to perform primary transfer of the toner images formed on photosensitive drums 52 onto an intermediate transfer belt of the intermediate transfer portion 5d. In addition, the engine controlling portion 50 controls the intermediate transfer portion 5d to transfer the toner image on the intermediate transfer belt onto the conveyed paper sheet (secondary transfer). The engine controlling portion 50 controls the fixing portion 5e to fix the transferred toner image on the paper sheet. The paper sheet after fixing the toner is discharged onto the discharge tray.

When performing duplex printing, the paper sheet after printing on one side is temporarily conveyed in the discharging direction to the discharge tray, and is switched back before being discharged, and is sent to the upstream side of the image forming portion 5c again. The engine controlling portion 50 controls the double-sided conveying portion 5f to perform the switch back of the paper sheet after printing on one side and rejoin of the paper sheet to the conveying portion 5b on the upstream side of the image forming portion 5c. As a result, printing on the backside is performed.

The multifunction peripheral 100 includes the communication portion 6a. The communication portion 6a is equipped with various connectors, sockets, and a chip for communication control. The communication portion 6a is connected to a computer 200 and a facsimile device 300 via a network, a public line, and a cable in a communicable manner. The communication portion 6a can send and receive electronic mail and image data to and from the computer 200 or the facsimile device 300. The main controlling portion 1 is connected to the communication portion 6a via the bus or the signal line. Further, the main controlling portion 1 controls the communication portion 6a to send and receive data in a job with sending and receiving data. The multifunction peripheral 100 also includes the wireless communication portion 6b. The wireless communication portion 6b performs wireless communication with a device such as a smartphone 400 or a tablet computer 500, so as to send or receive data.

(Paper Bag Creation Mode)

Next, with reference to FIGS. 2 to 16, a paper bag creation mode provided to the multifunction peripheral 100 according to the embodiment is described.

The multifunction peripheral 100 has the paper bag creation mode for readily creating a desired paper bag. When a predetermined operation for proceeding to the paper bag creation mode is made to the operation panel 4, the main controlling portion 1 recognizes that the instruction for changing the multifunction peripheral 100 to the paper bag creation mode is made. In the paper bag creation mode, various settings are made on screens displayed on the display panel 41. As a result, the main controlling portion 1 controls the printing portion 5 to print an original development 9 (paper bag) with tabs for sticking, which has a size suitable for a material to be housed and a desired design. Accordingly, a flow of settings in the paper bag creation mode is described below.

Figure 2:
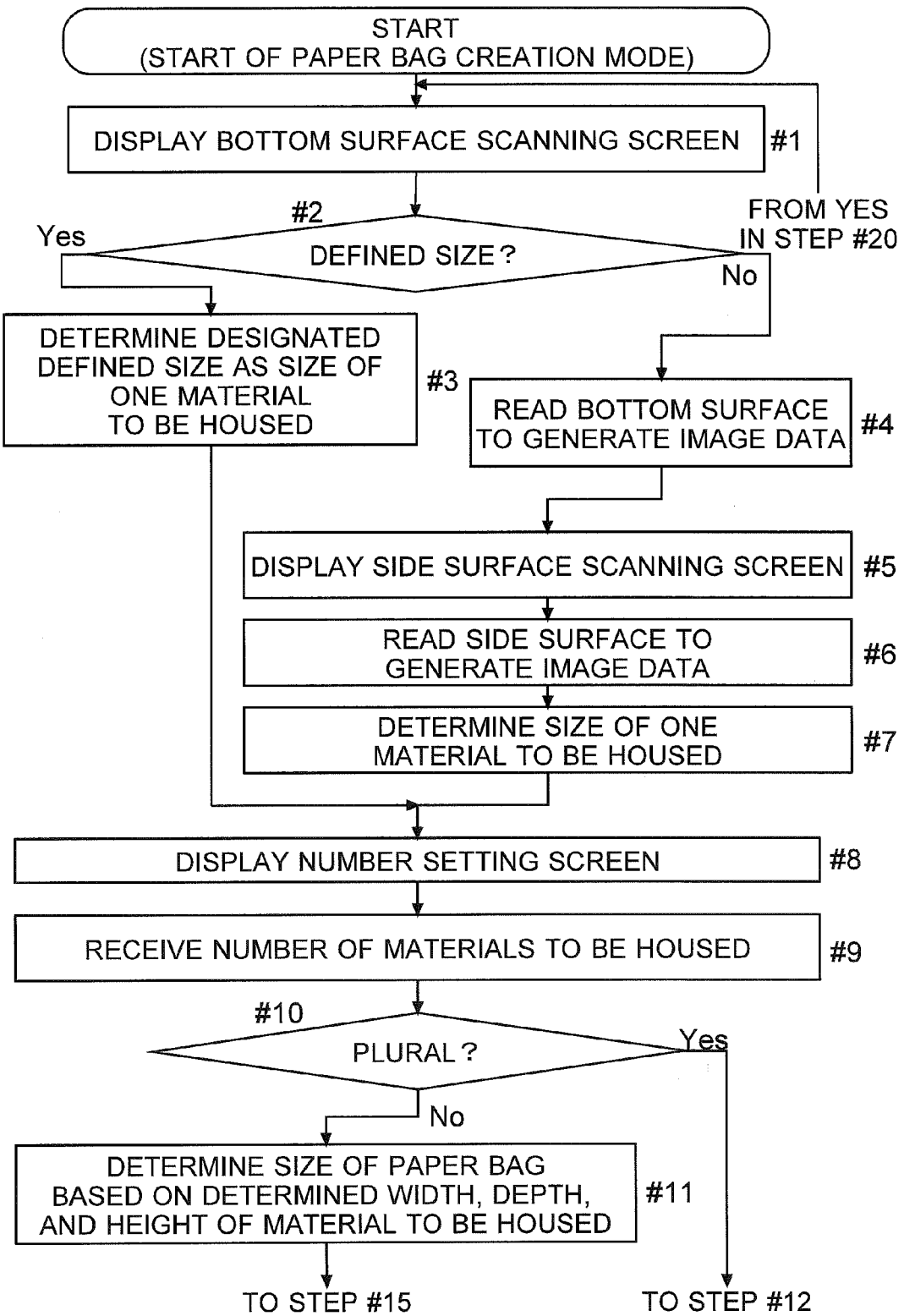
FIG. 2 is a flowchart illustrating an example of a flow of a paper bag creation mode according to the embodiment.
Figure 3:
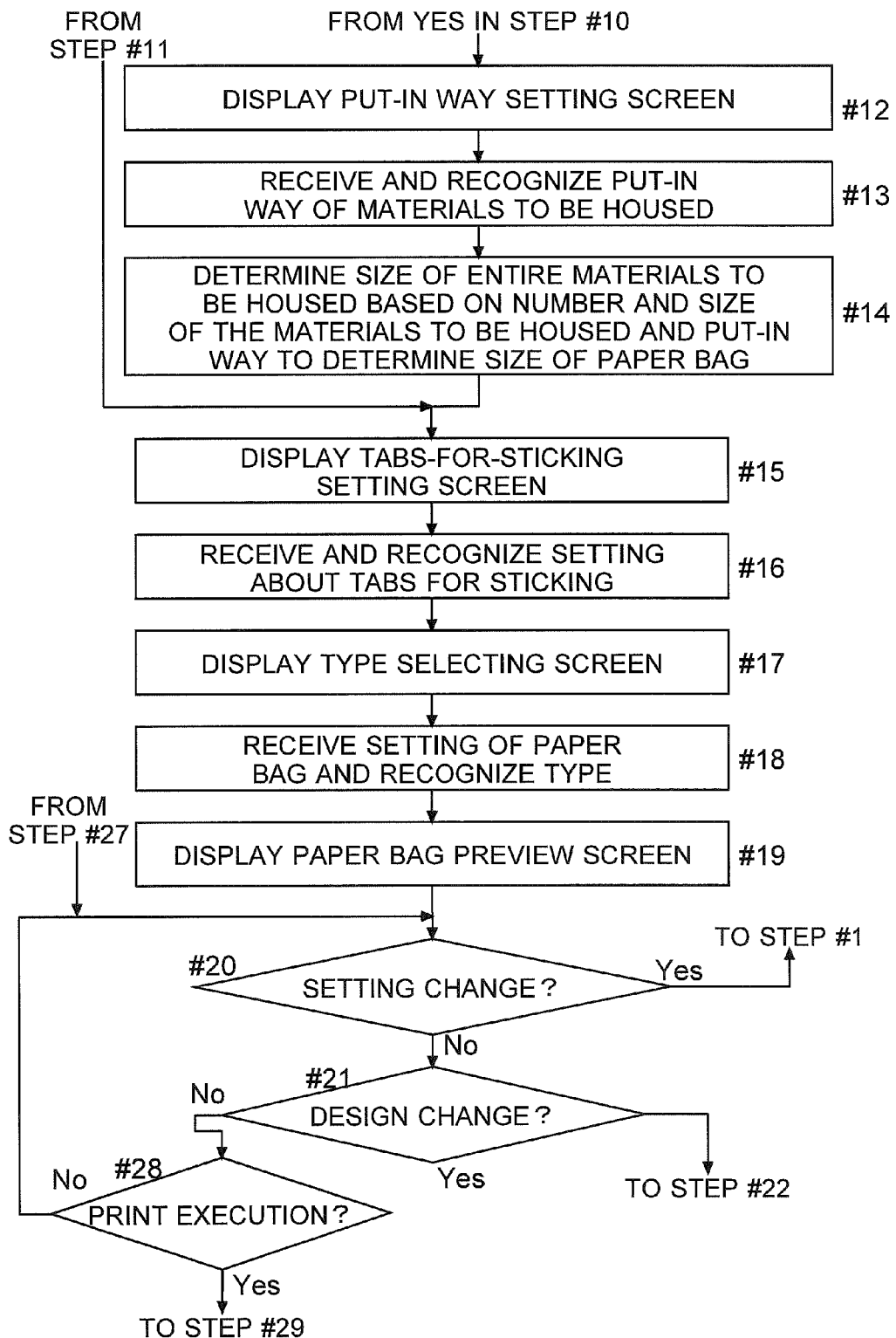
FIG. 3 is a flowchart illustrating the example of the flow of the paper bag creation mode according to the embodiment.
Figure 4:
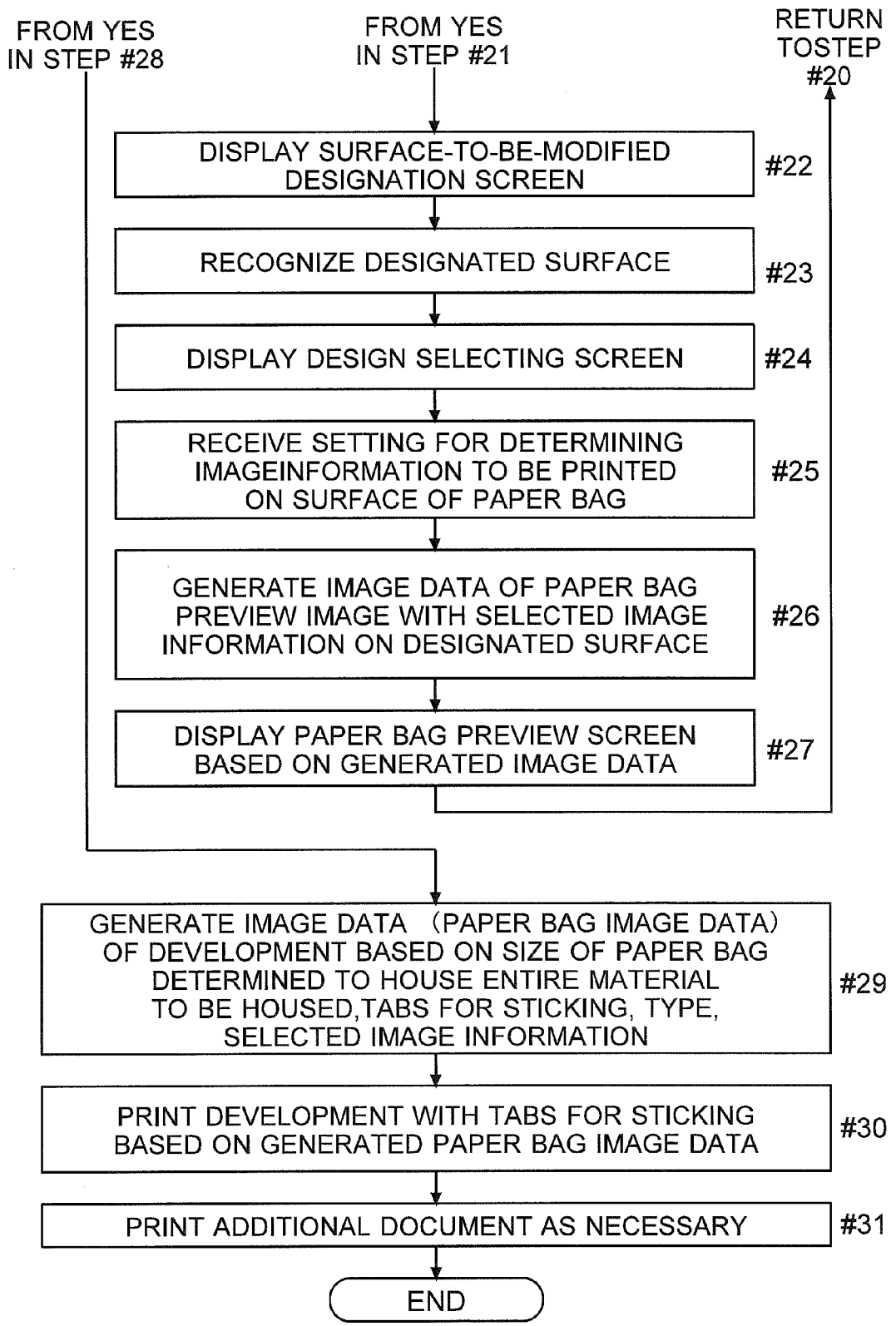
FIG. 4 is a flowchart illustrating the example of the flow of the paper bag creation mode according to the embodiment.

The flow of FIG. 2 starts when the predetermined operation for changing to the paper bag creation mode is made to the operation panel 4. First, the main controlling portion 1 controls the display panel 41 to display a bottom surface scanning screen 81 (see FIG. 5) (Step #1). The bottom surface scanning screen 81 is a screen for reading a bottom surface of the material to be housed for recognizing a size of the material to be housed.

Figure 5:
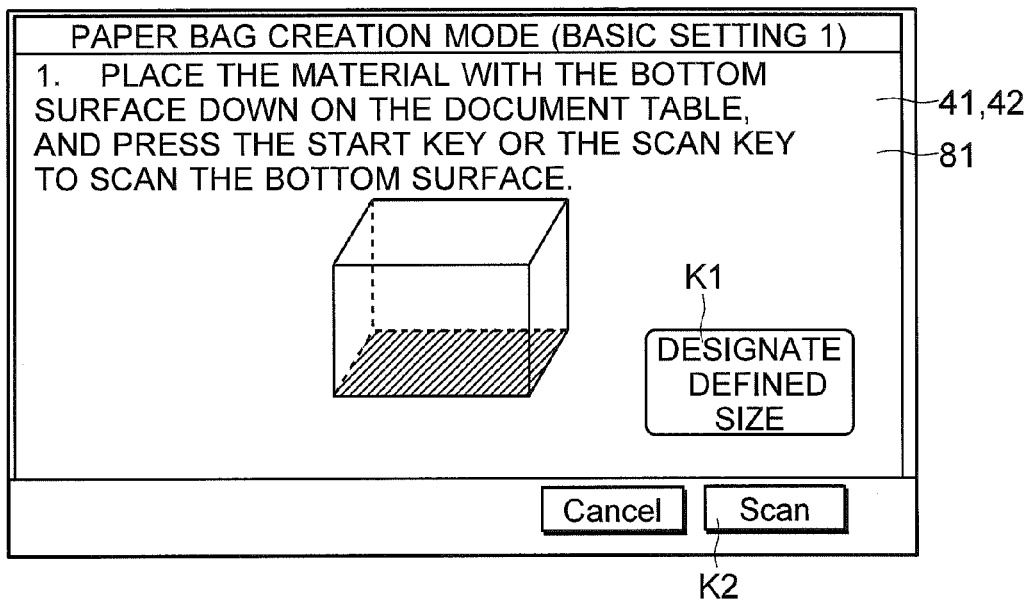
FIG. 5 is a diagram illustrating an example of a bottom surface scanning screen according to the embodiment.
Figure 6:
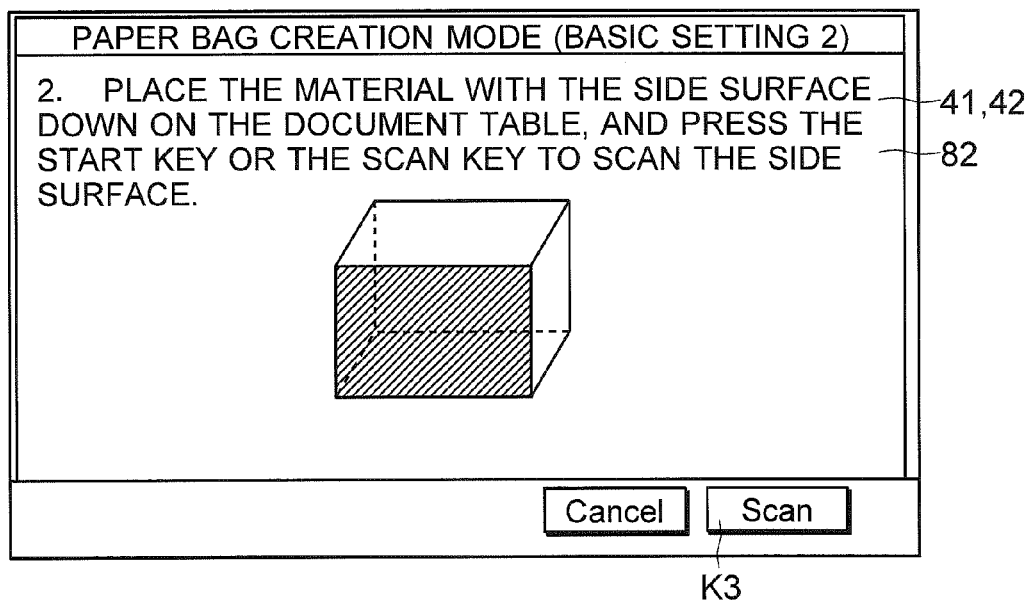
FIG. 6 is a diagram illustrating an example of a side surface scanning screen according to the embodiment.

As illustrated in FIG. 5, a defined size designation key K1 is disposed on the bottom surface scanning screen 81. When the defined size designation key K1 is operated, the main controlling portion 1 displays a list of a plurality of types of defined sizes (predetermined combinations of width, depth, and height) (not shown). The widths, depths, and heights of the individual defined sizes are appropriately determined. For example, the plurality of types of defined sizes are determined by referring to products such as paperback books and cases of video software, which have sizes determined by standards. When the list has a defined size corresponding to the size of the material to be housed, the user designates the appropriate defined size in the list. In this way, the size of the material to be housed can be set. When the precise size is not known, the size of the material to be housed is set by scanning.

Therefore the main controlling portion 1 checks whether or not the size of the material to be housed is set by designating one of the defined sizes (Step #2). When an operation for designating one of the defined sizes in the list is made to the touch panel portion 42 (Yes in Step #2), the main controlling portion 1 recognizes the designated defined size as the size of one material to be housed (Step #3). When the defined size is not designated (No in Step #2, when the start key as the hardware key 43 or a scan key K2 disposed on the bottom surface scanning screen 81 is operated), the main controlling portion 1 controls the image reading portion 3 to read the bottom surface of the material to be housed on the document table so as to generate image data of the bottom surface (Step #4).

Next to Step #4, the main controlling portion 1 controls the display panel 41 to display a side surface scanning screen 82 (see FIG. 6) (Step #5). The side surface scanning screen 82 is a screen for reading the side surface of the material to be housed so as to recognize the size of the material to be housed.

When the start key as the hardware key 43 or a scan key K3 disposed on the side surface scanning screen 82 is operated (touched), the main controlling portion 1 controls the side surface of the material to be housed placed on the document table of the image reading portion 3, so that image data of the side surface is generated (Step #6). In this way, the image reading portion 3 reads one surface (the bottom surface) and another surface (the side surface) connected to the one surface of the material to be housed in the paper bag, and generates image data of the one surface and image data of the another surface. Note that the scanning of the bottom surface and the side surface is performed in the state where the document cover is opened.

Then, the main controlling portion 1 determines a size (width, depth, and height) of the one material to be housed based on the image data of the one surface and the image data of the another surface obtained by the scanning (Step #7).

In the state where the document cover is opened, light from the lamp 31 is not reflected in the area where the material to be housed does not exist. Therefore in the image data, pixels corresponding to the part where the material to be housed does not exist have dark (black or high density of) pixel values. On the other hand, pixels corresponding to the part where the material to be housed exists have brighter (more whitish, lower density of) pixel values than the above-mentioned pixels.

Specifically, the main controlling portion 1 (the image processing portion 12) compares a predetermined threshold value with each pixel value of the image data of the bottom surface, so as to determine a boundary line between the part corresponding to the material to be housed and the part where the material to be housed does not exist. In other words, the image processing portion 12 determines the boundary between a line on which high density pixels continue and a line on which low density pixel pixels continue. Further, the image processing portion 12 determines an area surrounded by the boundary line (a block having pixel values lower than the threshold value) as an area of pixels obtained by reading the material to be housed. Further, the image processing portion 12 multiples a length of one pixel by the number of pixels (the number of lines) in a sub-scanning direction of the area of pixels obtained by reading the material to be housed in the image data obtained by reading the bottom surface, so as to determine a width of the material to be housed. In addition, the image processing portion 12 multiples the length of one pixel by the number of pixels (the number of lines) in a main scanning direction of the area of pixels obtained by reading the material to be housed, so as to determine a depth of the material to be housed.

Next, the image processing portion 12 multiples the length of one pixel by the number of pixels (the number of lines) in the sub-scanning direction of the area of pixels obtained by reading the material to be housed in the image data obtained by reading the side surface, so as to determine a first reference value. In addition, the image processing portion 12 multiples the length of one pixel by the number of pixels (the number of lines) in the main scanning direction of the area of pixels obtained by reading the material to be housed in the image data obtained by reading the bottom surface, so as to determine a second reference value.

As the side surface is read, one of the first reference value and the second reference value is a width or a depth of the material to be housed, and the other is a height of the material to be housed. Therefore the image processing portion 12 determines a first difference that is an absolute value of a difference between the first reference value and the width determined as described above, and a second difference that is an absolute value of a difference between the first reference value and the depth. In addition, the image processing portion 12 determines a third difference that is an absolute value of a difference between the second reference value and the width determined as described above, and a fourth difference that is an absolute value of a difference between the second reference value and the depth determined as described above. When the first difference or the second difference is smallest, the image processing portion 12 determines that the second reference value is the height. On the other hand, when the third difference or the fourth difference is smallest, the image processing portion 12 determines that the first reference value is the height. In this way, the width, the depth, and the height of the material to be housed can be determined. Note that other methods than that described above may be used for determining the size (width, depth, and height) of the material to be housed.

Figure 7:
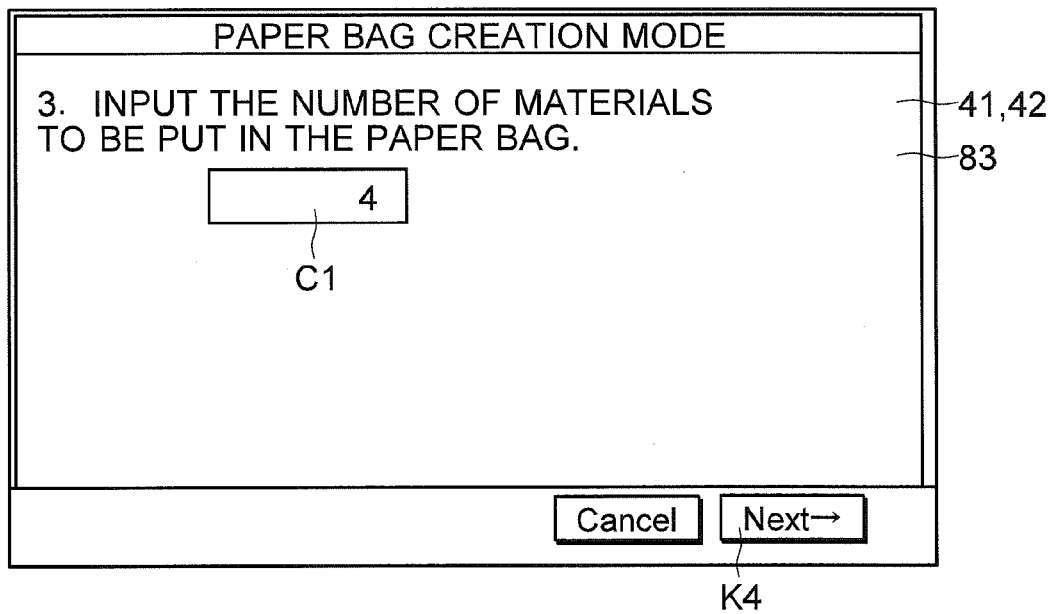
FIG. 7 is a diagram illustrating an example of a number setting screen according to the embodiment.

After the Step #3 or #7, the main controlling portion 1 controls the display panel 41 to display a number setting screen 83 (see FIG. 7) (Step #8). The number setting screen 83 is a screen for setting the number of the same materials to be housed in the paper bag. As illustrated in FIG. 7, the number setting screen 83 is provided with a number input box C1. The user touches (operations) a display position of the number input box C1 and then inputs the number of the same materials to be housed in the paper bag by using the ten-key of the hardware keys 43.

The touch panel portion 42 or the hardware key 43 receives setting of the number of the materials to be housed (Step #9). Further, the main controlling portion 1 checks whether or not the set number is plural (Step #10). In other words, it checks a value in the number input box C1 when a Next key K4 is operated. When the set number is one (one material to be housed) (No in Step #10), the main controlling portion 1 determines the size (width, depth, and height) of the paper bag based on the determined width, depth, and height of the material to be housed (Step #11).

Specifically, in Step #7, the main controlling portion 1 recognizes the material to be housed as one hexahedron based on the image data of the one surface and the image data of the another surface, and determines the width, depth, and height of the hexahedron. Accordingly, when the material to be housed is one material (No in Step #10), the main controlling portion 1 adds a predetermined first margin to the recognized width so as to determine the obtained length as the width of the paper bag, and adds a predetermined second margin to the recognized depth so o as to determine the obtained length as the depth of the paper bag, and adds a predetermined third margin to the recognized height so as to determine the obtained length as the height of the paper bag. In other words, the size of the paper bag is determined to be a little larger than the material to be housed so that the material to be housed can be smoothly put in.

Here, the first margin, the second margin, and the third margin may be the same length or different lengths. In order that the material hardly drops out of the paper bag, the third margin (added to the height) may be longer than the first margin and the second margin. In addition, the main controlling portion 1 may control to display a screen for setting the margins. In this case, the touch panel portion 42 or the hardware key 43 receives an operation for setting the margins. The main controlling portion 1 controls the storage portion 2 to store the set margins. Further, the main controlling portion 1 determines the size of the paper bag by using the margins stored in the storage portion 2.

Figure 8:
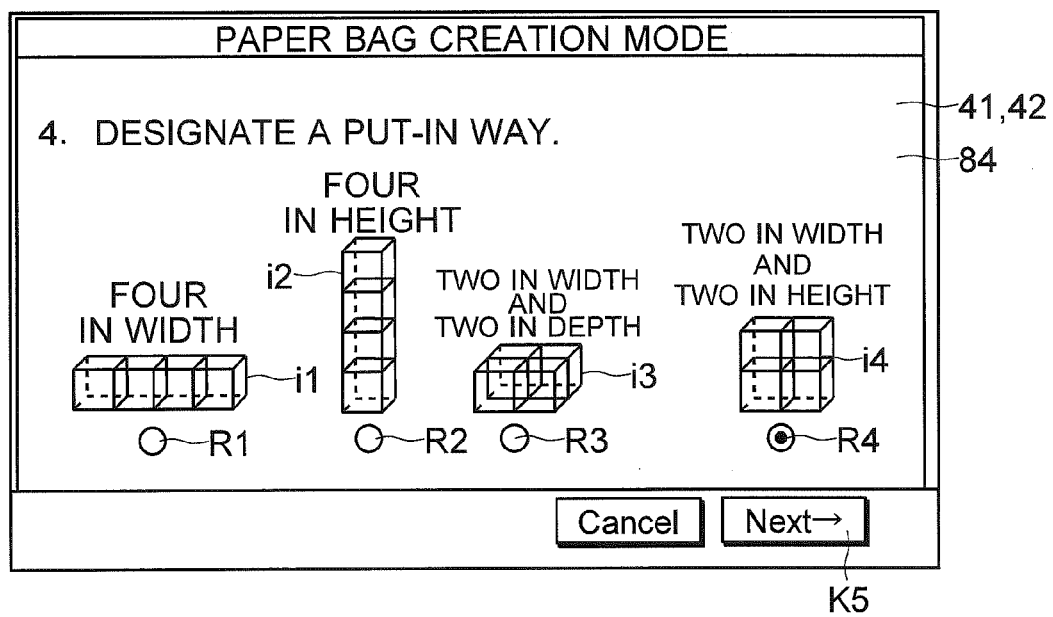
FIG. 8 is a diagram illustrating an example of a put-in way setting screen according to the embodiment.

On the other hand, when the set number (of the materials to be housed) is plural (Yes in Step #10), the main controlling portion 1 controls the display panel 41 to display a put-in way setting screen 84 (see FIG. 8) (Step #12). The put-in way setting screen 84 is a screen for setting a way to put the materials to be housed into the paper bag. The put-in way setting screen 84 of FIG. 8 illustrates an example of the put-in way setting screen 84 in a case of four materials to be housed. The put-in way setting screens 84 are prepared corresponding to the number of materials to be housed. However, they are common in setting the way to put in, and hence illustration and description of the put-in way setting screens 84 in cases of two, three, five and more materials to be housed are omitted.

FIG. 8 illustrates an example in which the main controlling portion 1 controls the display panel 41 to display four types of put-in way images i1, i2, i3, and i4 in the case of four materials to be housed. The put-in way images i1 to i4 are respectively provided with radio buttons R1, R2, R3, and R4. The touch panel portion 42 receives an operation of one of the radio buttons as an operation for designating the put-in way of the materials to be housed. The main controlling portion 1 recognizes the put-in way corresponding to the radio button in a turned-on state when a Next key K5 is operated, as the way to put the plurality of same materials to be housed into the paper bag (Step #13).

Further, when the set number (of the materials to be housed) is plural (Yes in Step #10), and when the number of materials and the put-in way are set, the main controlling portion 1 determines the total size of the materials to be housed (total width, total depth, and total height) based on the determined width, depth, and height of one material to be housed, the number of materials, and the put-in way, so as to determine the size (width, depth, and height) of the paper bag (Step #14).

Specifically, the main controlling portion 1 recognizes the materials to be housed as one hexahedron and determines the width, depth, and height of the hexahedron based on the image data of the one surface and the image data of the another surface in Step #7. In addition, the main controlling portion 1 recognizes the number of the same materials to be housed in the paper bag and the put-in way (Steps #9 and #13). Therefore, when a plurality of the same materials are to be housed in the paper bag, the main controlling portion 1 recognizes the total width, total depth, and total height of the entire materials to be housed, based on the set number of the materials to be housed and the put-in way. For example, when two materials to be housed are arranged in the width direction, main controlling portion 1 determines the total width by doubling the determined width of the material to be housed. When two materials to be housed are arranged in the depth direction, the main controlling portion 1 determines the total depth by doubling the determined depth of the material to be housed. When two materials to be housed are stacked in the height direction, the main controlling portion 1 determines the total height by doubling the determined height of the material to be housed. In other words, the main controlling portion 1 recognizes the total width, total depth, and total height of the materials to be housed by integral multiplication of one or more of the width, depth, and height of the one material to be housed based on the arranging direction and the number of the arrangement.

The main controlling portion 1 determines the length of the recognized total width plus a first margin as the width of the paper bag, and determines the length of the recognized total depth plus a second margin as the depth of the paper bag, and determines the length of the recognized total height plus a third margin as the height of the paper bag. In this way, the main controlling portion 1 determines the width, depth, and height of the paper bag.

After Step #11 or Step #14, the main controlling portion 1 controls the display panel 41 to display a tabs-for-sticking setting screen 85 (see FIG. 9) (Step #15). The tabs-for-sticking setting screen 85 is a screen for determining the width of tabs for sticking 91 according to weight of the materials to be housed. The main controlling portion 1 set the width of the tabs for sticking 91 to be larger as the materials to be housed are heavier. Specifically, the main controlling portion 1 sets the width of the tabs for sticking larger in the direction perpendicular to the side to which the tab for sticking 91 is provided as the material to be housed is heavier.

Figure 9:
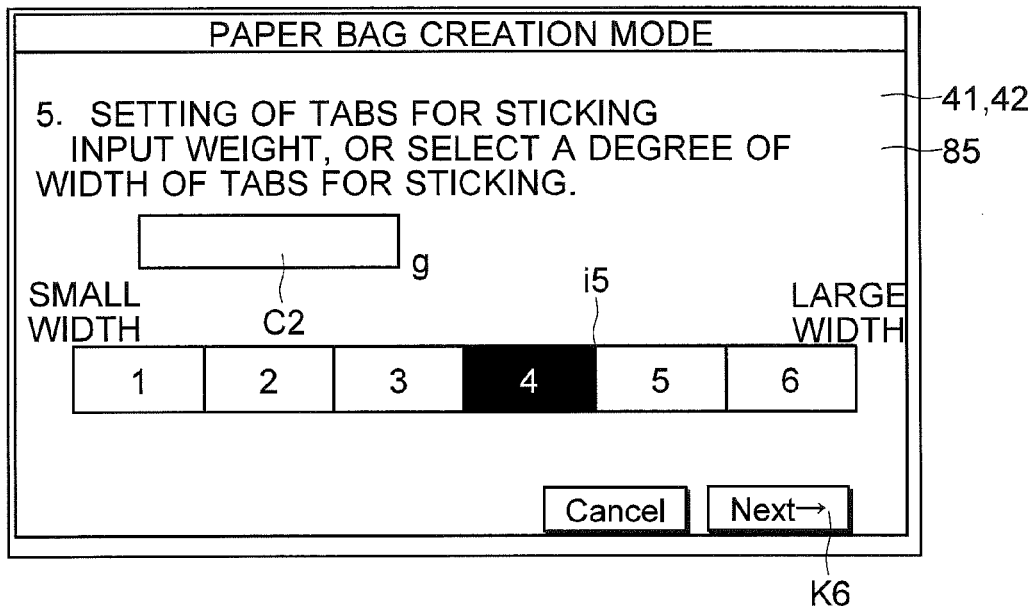
FIG. 9 is a diagram illustrating an example of a tabs-for-sticking setting screen according to the embodiment.

As illustrated in FIG. 9, a weight input box C2 is disposed on the tabs-for-sticking setting screen 85. When the total weight of the materials to be housed is known, the user touches (operations) the display position of the weight input box C2, and then input the weight using the ten-key in the hardware keys 43. Further, when a plurality of materials are to be housed in the paper bag, the total weight of the materials to be housed is input. In this way, the touch panel portion 42 or the hardware key 43 receives setting of the weight of the materials to be housed in the paper bag.

On the other hand, as illustrated in FIG. 9, the tabs-for-sticking setting screen 85 is provided with a tabs-for-sticking level setting image i5. The tabs-for-sticking level setting image i5 is an image including rectangles arranged in a row. A number indicating a level from 1 to 6 is in each of the rectangles. FIG. 9 illustrates the state where the tabs-for-sticking level is set to 4. When a plurality of materials are to be housed in the paper bag, it is necessary to consider the total weight of the materials to be housed so as to set the level.

The main controlling portion 1 sets the width of the tabs for sticking 91 in the development 9 to be smaller as the level is a smaller number. In this way, the touch panel portion 42 or the hardware key 43 receives setting for determining the width of the tabs for sticking 91. The main controlling portion 1 recognizes the width of the tabs for sticking 91 in the development 9 to be created, based on the operation.

The touch panel portion 42 or the hardware key 43 receives setting about the tabs for sticking 91 based on the operation to the weight input box C2 and the tabs-for-sticking level setting image i5. The main controlling portion 1 recognizes the set content (set state) (Step #16). When a Next key K6 disposed on the tabs-for-sticking setting screen 85 is operated, the main controlling portion 1 controls the display panel 41 to display a type selecting screen 86 (see FIG. 10) (Step #17). The type selecting screen 86 is a screen for selecting a type of the paper bag.

Figure 10:
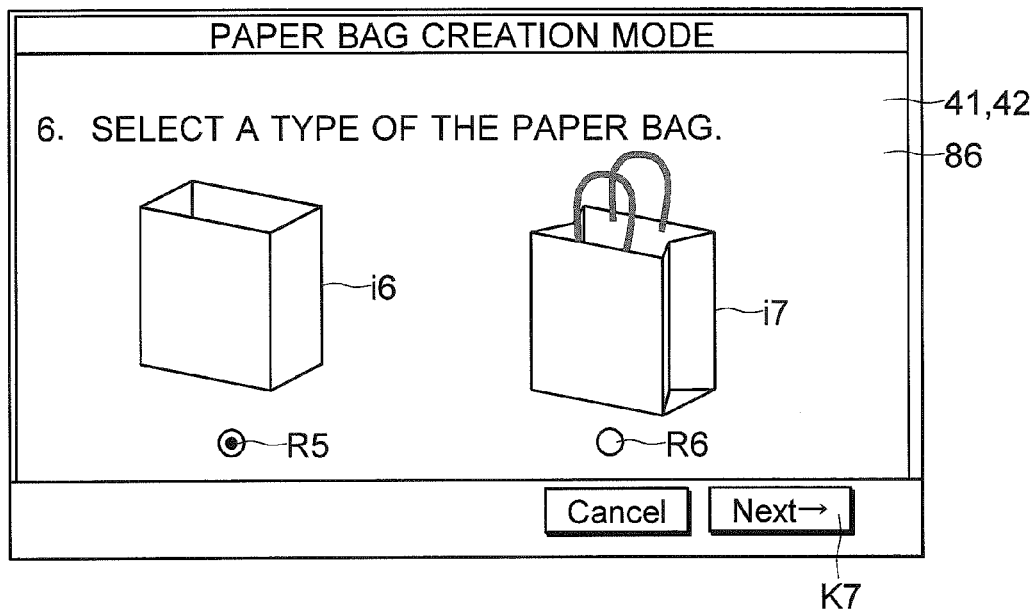
FIG. 10 is a diagram illustrating an example of a type selecting screen according to the embodiment.

FIG. 10 illustrates an example in which the main controlling portion 1 controls to display two images indicating types of the paper bag on the type selecting screen 86. A paper bag image i6 on the left side shows a paper bag without handle strap. A paper bag image i7 on the right side shows a paper bag with handle straps. The paper bag image i6 on the left side is provided with a radio button R5. The paper bag image i7 on the right side is provided with a radio button R6. The touch panel portion 42 receives an operation to the radio button R5 or the radio button R6. The main controlling portion 1 recognizes a type of the paper bag for which the development 9 is created, based on the operated radio button (Step #18).

When a Next key K7 disposed on the type selecting screen 86 is operated, the main controlling portion 1 controls the display panel 41 to display a paper bag preview screen 87 (see FIG. 11) (Step #19). The paper bag preview screen 87 is a screen displaying a paper bag preview image i8 in the case of assembling the paper sheet after printing based on paper bag image data (in a completed state), based on the current setting.

Figure 11:
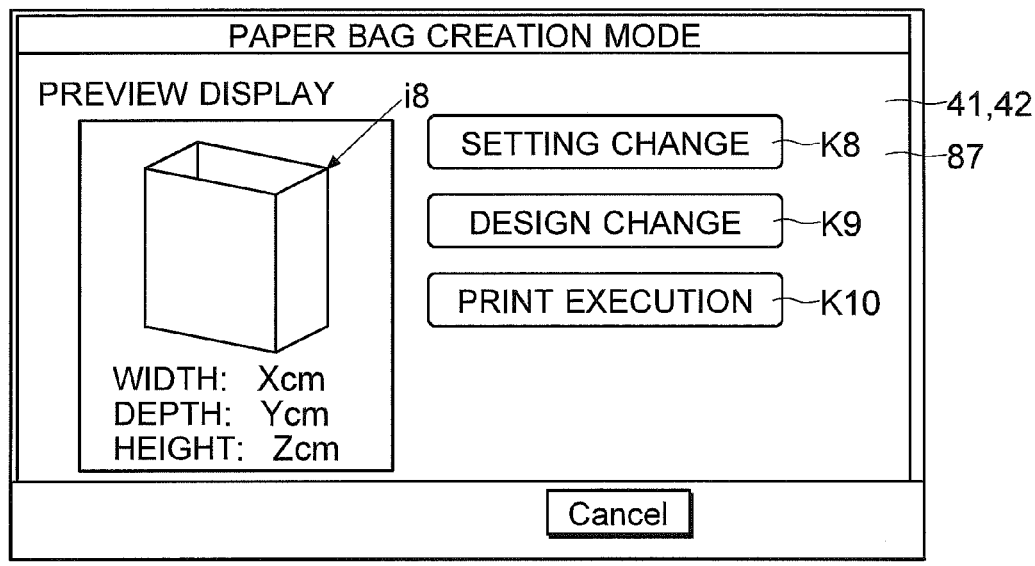
FIG. 11 is a diagram illustrating an example of a paper bag preview screen according to the embodiment.

As illustrated in FIG. 11, the main controlling portion 1 controls the display panel 41 to display the paper bag preview image i8 corresponding to a type of the selected paper bag. In addition, the main controlling portion 1 controls the display panel 41 to display the paper bag preview image i8 with the actual width, depth, and height of the paper bag determined based on the number of materials to be housed and the put-in way.

Here, as illustrated in FIG. 11, the paper bag preview screen 87 is provided with a setting change key K8, a design change key K9, and a print execution key K10. By operating the setting change key K8, the current setting about creation of the paper bag can be changed. In addition, by operating the design change key K9, the design to be applied to the surface of the paper bag can be set or changed. By operating the print execution key K10, it is possible to print the development 9 of the paper bag with the current setting.

Therefore the main controlling portion 1 checks whether or not the setting change key K8 is operated (touched) (Step #20). When the setting change key K8 is operated (Yes in Step #20), the flow returns to Step #1. In this way, it is possible to redo the setting.

When the setting change key K8 is not operated (No in Step #20), the main controlling portion 1 checks whether or not the design change key K9 is operated (touched) (Step #21). When the design change key K9 is operated (Yes in Step #21), the main controlling portion 1 controls the display panel 41 to display a surface-to-be-modified designation screen 88 (see FIG. 12) (Step #22). The surface-to-be-modified designation screen 88 is a screen for designating the surface of the paper bag on which the design (pattern) should be changed among the surfaces.

Figure 12:
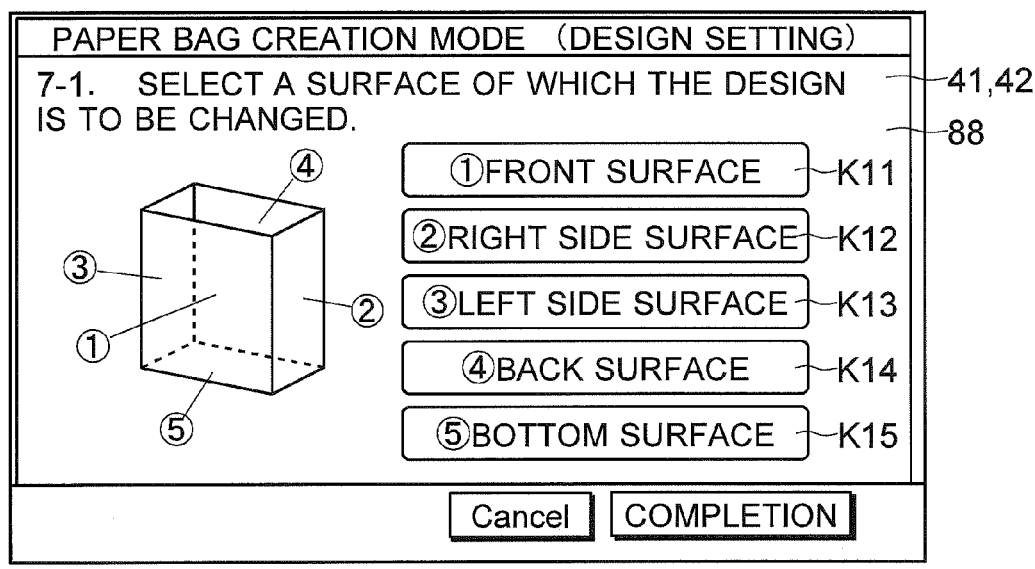
FIG. 12 is a diagram illustrating an example of a surface-to-be-modified designation screen according to the embodiment.

As illustrated in FIG. 12, the surface-to-be-modified designation screen 88 is provided with five keys (a front surface key K11, a right side surface key K12, a left side surface key K13, a back surface key K14, and a bottom surface key K15) for designating the surface on which the design should be changed. By operating (touching) the front surface key K11, the design (pattern) to be applied to the front surface part of the paper bag can be set. By operating (touching) the right side surface key K12, the design (pattern) to be applied to the right side surface part of the paper bag can be set. By operating (touching) the left side surface key K13, the design (pattern) to be applied to the left side surface part of the paper bag can be set. By operating (touching) the back surface key K14, the design (pattern) to be applied to the back surface part of the paper bag can be set. By operating (touching) the bottom surface key K15, the design (pattern) to be applied to the bottom surface part of the paper bag can be set. In this way, the touch panel portion 42 receives the setting for determining image information i9 for each surface of the paper bag.

The main controlling portion 1 recognizes a surface designated as the surface to be modified on the surface-to-be-modified designation screen 88 based on an output of the touch panel portion 42 (Step #23). When the designation is made, the main controlling portion 1 controls the display panel 41 to display a design selecting screen 89 (see FIG. 13) (Step #24). The design selecting screen 89 is a screen for selecting a design (pattern) of the designated surface.

Figure 13:
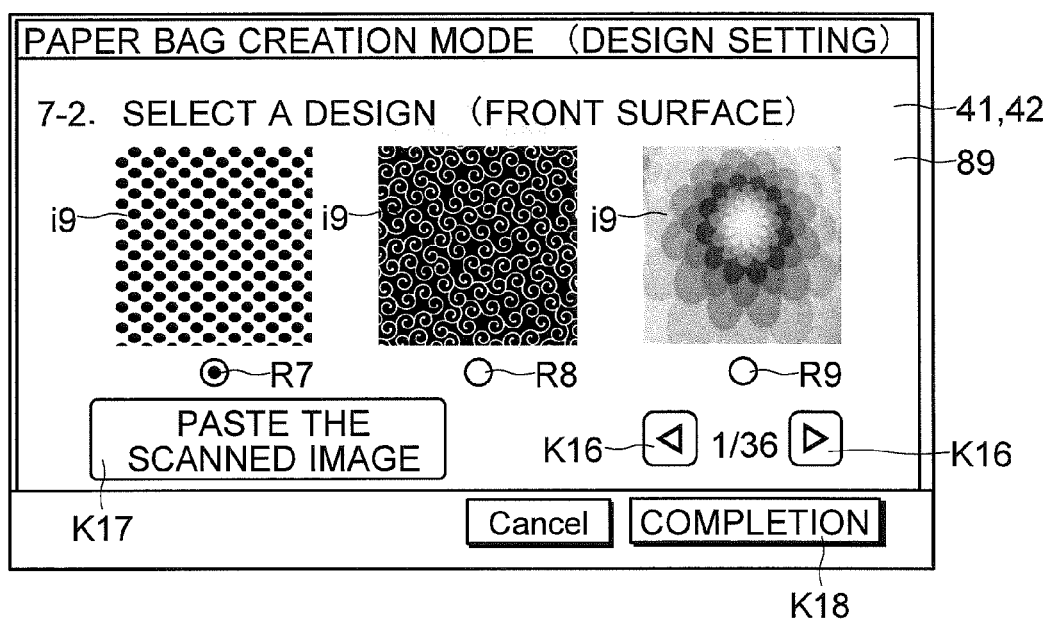
FIG. 13 is a diagram illustrating an example of a design selecting screen according to the embodiment.

FIG. 13 illustrates an example in which the main controlling portion 1 controls to display three image information i9 (pattern images) in one screen (in the design selecting screen 89). The individual image information i9 are provided with a radio button R7, a radio button R8, and a radio button R9, respectively. The touch panel portion 42 receives an operation to one of the radio buttons as an operation for selecting a design.

Here, the storage portion 2 stores a plurality of types of the image information i9 to be printed on the surface of the paper bag. In other words, the storage portion 2 stores a plurality of image data of patterns to be printed on the surface of the paper bag. However, the number of the image information i9 that can be displayed on one screen is limited. Therefore, two page change keys K16 are disposed on the design selecting screen 89. When the page change key K16 is operated, the main controlling portion 1 controls the display panel 41 to change to other image information i9. FIG. 13 illustrates an example in which the storage portion 2 stores 108 (3 in each of 36 pages) image information i9.

Additional image information i9 can be stored in the storage portion 2 so that the user can paste favorite image information i9. In other words, the multifunction peripheral 100 includes an input portion for inputting the image information i9. When the image information i9 is input from the computer 200 such as a PC, the communication portion 6a functions as the input portion. When the image information i9 is input via transmission from the smartphone 400 or the tablet computer 500, the wireless communication portion 6b functions as the input portion. When image data obtained by scanning a document is input as the image information i9, the image reading portion 3 functions as the input portion. The storage portion 2 accumulates the image information i9 input to the input portion. The user can print desired patterns, characters, and figures on the paper bag.

Note that it is also possible to paste the image data obtained by scanning the document as the image information i9 directly on the designated surface. For this pasting, a scan paste key K17 is disposed in the design selecting screen 89. The user sets the document on the document table of the image reading portion 3. Further, when the scan paste key K17 is operated (touched), the main controlling portion 1 controls the image reading portion 3 to perform reading. The main controlling portion 1 (the image processing portion 12) performs image processing (reduction, or enlargement in some cases) on the image data obtained by reading the document, so that the image is placed within the designated surface. Further, the main controlling portion 1 handles the image data after the image processing as the image information i9 to be pasted. In this way, the user can readily paste the image information i9 containing desired characters, figures and symbols on desired surfaces of the paper bag.

By selection of the radio button and operation of the scan paste key K17, the touch panel portion 42 accepts setting for determining the image information i9 to be printed on each of the surfaces of the paper bag (Step #25). The main controlling portion 1 recognizes this setting as an instruction to apply the selected image information i9 to the designated surface.

When a completion key K18 is operated on the design selecting screen 89 so that the setting is completed, the main controlling portion 1 (the image processing portion 12) generates image data of the paper bag preview image i8 with the selected image information i9 applied to the designated surface (Step #26). Further, the main controlling portion 1 controls the display panel 41 to display the paper bag preview screen 87, using the newly generated image data of the paper bag preview image i8 (Step #27). In this way, every time when the image information i9 is selected, a preview image on which the selection is reflected is displayed. Further, the flow returns to Step #20.

Figure 14:
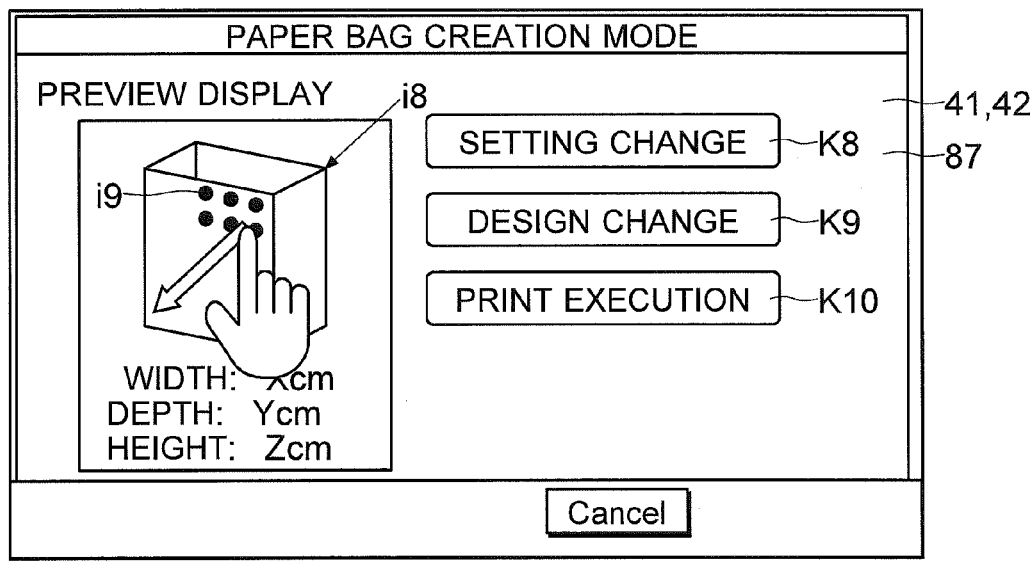
FIG. 14 is a diagram illustrating an example of a movement operation on the paper bag preview screen according to the embodiment.

FIG. 14 illustrates an example in which the main controlling portion 1 controls the display panel 41 to update and display the paper bag preview image i8 based on the newly generated paper bag preview image i8. FIG. 14 illustrates an example in which a ball pattern as the image information i9 is pasted on the front surface of the paper bag.

Figure 15:
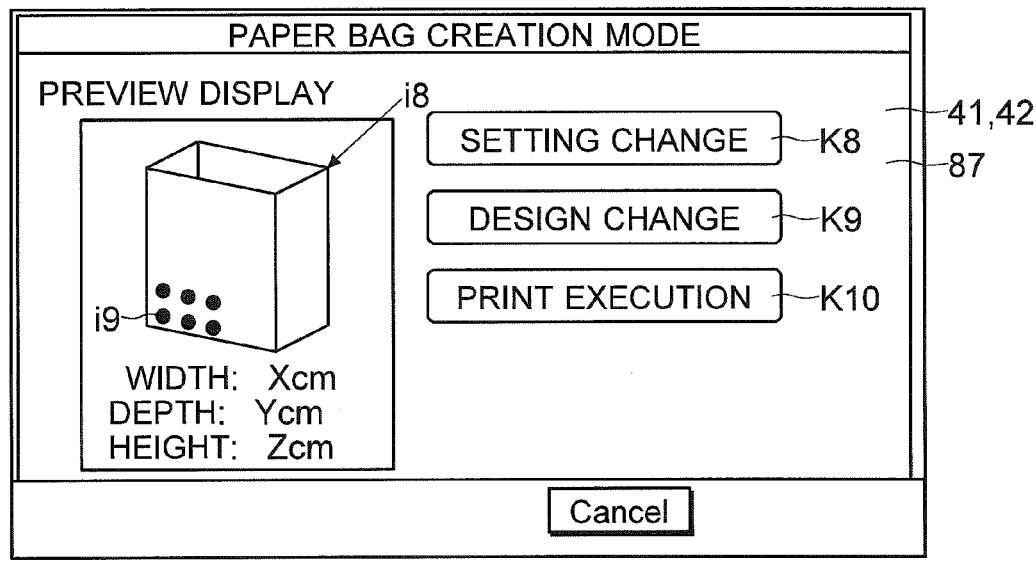
FIG. 15 is a diagram illustrating the example of the movement operation on the paper bag preview screen according to the embodiment.

Here, the position of the image information i9 can be adjusted by touching a display position of the pattern of the touch panel portion 42 on the paper bag preview screen 87 and moving the touch position while continuing to touch. In other words, the touch panel portion 42 receives setting for adjusting a position of the image information i9. FIG. 15 illustrates a state after the position of the ball pattern (image information i9) is changed from the upper part to the lower part based on the operation for adjusting the position of the image information i9 in FIG. 14.

When the design change key K9 is not operated (No in Step #21), the main controlling portion 1 checks whether or not the print execution key K10 is operated (touched) (Step #28). When the print execution key K10 is not operated (No in Step #28), the flow returns to Step #20.

When the print execution key K10 is operated (Yes in Step #28), the main controlling portion 1 generates the paper bag image data that is image data of the development 9 with tabs for sticking for assembly of the paper bag in which the entire materials to be housed can fit, based on the setting (Step #29). In other words, the main controlling portion 1 generates image data of the development 9 of the paper bag having sides of the width, depth, and height of the determined paper bag. A positional relationship among the front surface, the back surface, the right side surface, the left side surface, the bottom surface, and the tabs for sticking 91 in the paper bag image data (development 9) is the same in any of the paper bags.

Specifically, on the basis of the setting of weight of the material to be housed and width of the tabs for sticking 91, the main controlling portion 1 generates the paper bag image data with tabs for sticking 91, which have a larger width as the set weight of the material to be housed is heavier or as the set level number of the width of the tabs for sticking 91 is larger. In addition, the main controlling portion 1 generates the paper bag image data corresponding to the set type of the paper bag. For example, in the case of the paper bag with handle straps, the main controlling portion 1 prints the positions at which the handle straps are attached.

In addition, the main controlling portion 1 generates a first image data with the set image information i9 and a second image data including the development 9 with tabs for sticking, as the paper bag image data, so that the pattern and lines of the development 9 are not printed on the same surface of the paper sheet when the pattern (image information i9) is applied. In addition, the main controlling portion 1 generates the first image data with the image information i9 so that the set image information i9 is printed on the set surface of the image information i9. In other words, the main controlling portion 1 generates the first image data and the second image data, so that the selected image information i9 is printed on the surface opposite to the surface of the development 9 with the image information i9. In addition, when a position of the image information i9 on the paper bag preview screen 87 is adjusted, the controlling portion generates the first image data (paper bag image data) in which the image information i9 is located at the position after the adjustment.

The main controlling portion 1 controls the printing portion 5 to print the development 9 with tabs for sticking based on the generated paper bag image data (Step #30).

Further, when the image information i9 is pasted (selected), the main controlling portion 1 controls the printing portion 5 to perform the duplex printing based on the first image data and the second image data. In this case, the main controlling portion 1 controls to print the paper bag image data on the smallest paper sheet in which the generated paper bag image data can fit, among paper sheets stored in the paper sheet feeder 5a. Note that the operation panel 4 (the touch panel portion 42 or the hardware key 43) receives setting of sizes of the paper sheets stored in the paper sheet feeder 5a.

When the paper bag image data cannot fit in the largest paper sheet among the paper sheets stored in the paper sheet feeder 5a, the main controlling portion 1 controls the display panel 41 to display a message indicating that the paper sheet should be changed or that the printing can be performed on one paper sheet. Alternatively, the main controlling portion 1 may divide the paper bag image data so that the printing portion 5 prints them on a plurality of paper sheets.

If necessary, the main controlling portion 1 prints a predetermined additional document (Step #31 to END). The additional document can be appropriately determined. For example, the main controlling portion 1 may control the printing portion 5 to print an assembly illustration of the paper bag as the additional document. In addition, when the paper bag with handle straps is selected, the main controlling portion 1 may controls the printing portion 5 to print a paper sheet for making the handle straps. In addition, the main controlling portion 1 may control the display panel 41 to display a setting screen so that the touch panel portion 42 receives whether or not it is necessary to print the illustration and the paper sheet for making the handle straps. When it is necessary to print the additional document based on setting with the operation panel 4 (the display panel 41 and the touch panel portion 42), the main controlling portion 1 controls the printing portion 5 to print the additional document in Step #31. If it is not necessary, Step #31 should be skipped.

Figure 16:
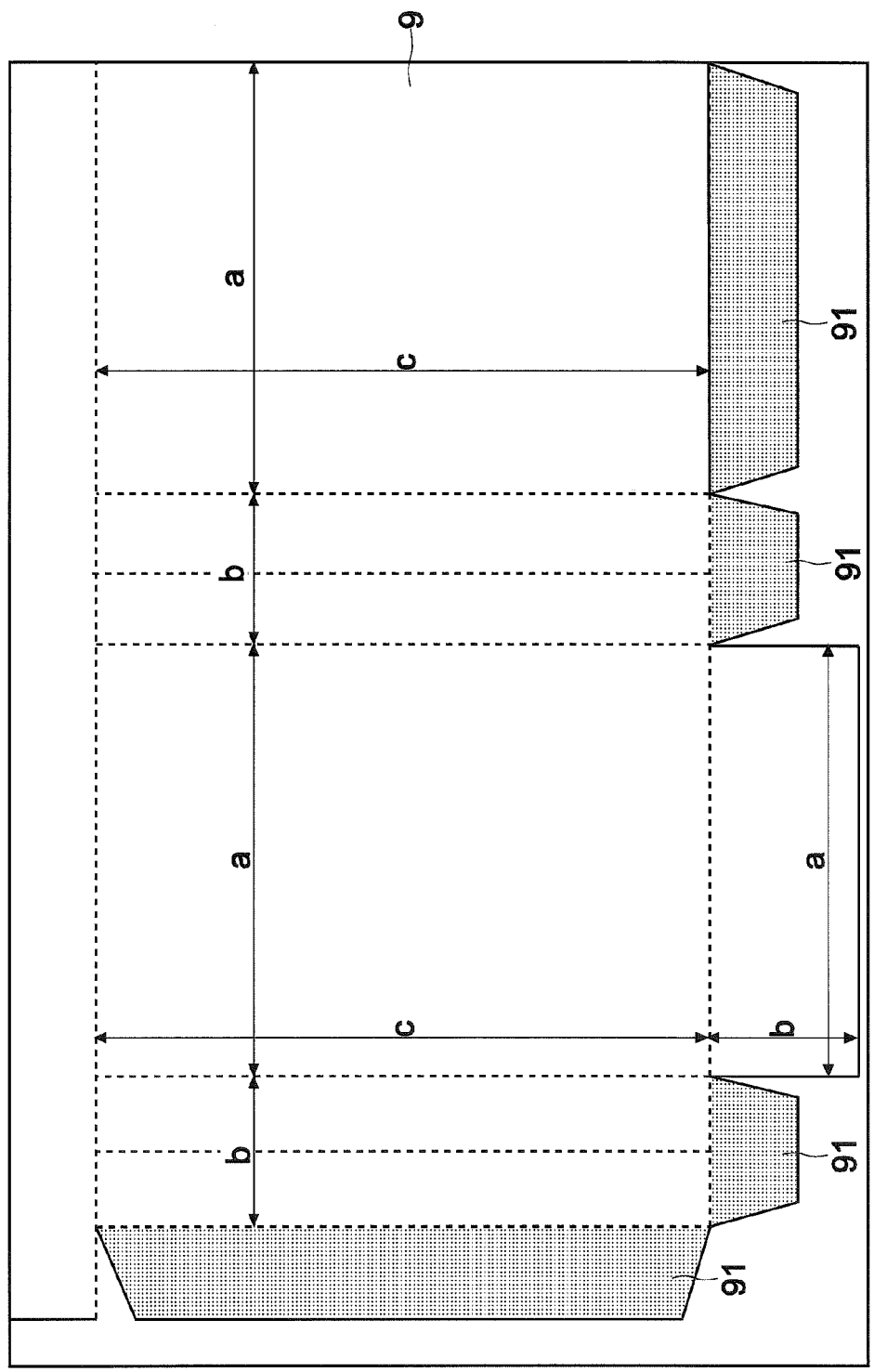
FIG. 16 is a diagram illustrating an example of a development with tabs for sticking printed by the multifunction peripheral according to the embodiment.

FIG. 16 illustrates an example of the printed development 9 of the paper bag. In FIG. 16, periphery solid lines are end sides of the paper sheet. Solid lines in the paper sheet are cutoff lines. Broken lines are folding lines. Dot meshing areas are tabs for sticking 91. End parts of the tabs for sticking 91 are printed in a cut-out state so that gluing and assembly can be easily performed. In addition, in FIG. 16, "a" represents the width, "b" represents the depth, and "c" represents the height. Further, FIG. 16 illustrates an example of printing the paper bag (the development with tabs for sticking) in which an upper edge of the paper bag is folded for securing strength.

The multifunction peripheral 100 includes a retaining portion 7 that retains an adhesive member 71 such as an adhesive or a double-sided adhesive tape (see FIG. 1). Using the adhesive member 71, it is possible to promptly start assembling the development 9 (paper bag). In addition, the retaining portion 7 may also retain a cutting tool such as scissors or a cutter for cutting the paper sheet.

In this way, the image forming apparatus (the multifunction peripheral 100) according to the embodiment includes the receiving portion (the touch panel portion 42, the hardware key 43) for receiving setting, the image reading portion 3 for reading one surface and another surface connected to the one surface of a material to be housed in a paper bag, so as to generate image data of the one surface and image data of the another surface, the controlling portion (the main controlling portion 1) configured to recognize a size of the material to be housed based on the image data of the one surface and the image data of the another surface, so as to generate paper bag image data that is image data of the development 9 of the paper bag housing the entire of the material to be housed, the development 9 being with tabs for sticking for assembly, and the printing portion 5 for printing the development 9 with tabs for sticking on the paper sheet based on the paper bag image data.

In this way, by creating the paper bag based on the development 9, the paper bag of a desired size adapted to the material to be housed can be obtained. In addition, the cost is not high even if a small number of paper bags are needed. In addition, it is not necessary to do a troublesome work with effort to finely and precisely measure the size of the material to be housed and to manually input the measurement result. Only by reading the material to be housed with the image reading portion 3 (scanner), the paper bag optimal for the size of the material to be housed can be easily and quickly obtained. Even if a size of the product is changed by model change, a paper bag adapted to the size after the change can be promptly prepared.

The receiving portion (the touch panel portion 42, the hardware key 43) receives setting of a weight of the material to be housed in the paper bag. The controlling portion (the main controlling portion 1) generates the paper bag image data with the tabs for sticking 91 having a larger width as the set weight is heavier. In this way, as the material to be housed in the paper bag is heavier, the width of the tabs for sticking 91 is set larger, and hence strength of the paper bag can be enhanced. Therefore it is possible to provide the paper bag that is strong and sufficiently endures actual use.

The receiving portion (the touch panel portion 42, the hardware key 43) receives setting for determining a width of the tabs for sticking 91. The controlling portion (the main controlling portion 1) generates the paper bag image data with the tabs for sticking 91 having a width corresponding to setting. In this way, even if a precise weight of the material to be housed is not known, the width of the tabs for sticking 91 can be determined in consideration of the weight of the material to be housed. Therefore the user can set the width of the tabs for sticking 91 so that the paper bag that is strong and endures actual use can be obtained.

The receiving portion (the touch panel portion 42, the hardware key 43) receives setting for determining a type of the paper bag. The controlling portion (the main controlling portion 1) generates the paper bag image data corresponding to the set type of the paper bag. In this way, a type of the paper bag to be created can be selected from a plurality of types. Therefore the user can obtain a desired type of the paper bag.

In addition, the image forming apparatus includes the storage portion 2 for storing the plurality of types of image information i9 to be printed on the surface of the paper bag. The receiving portion (the touch panel portion 42, the hardware key 43) receives setting for determining the image information i9 to be printed on the surface of the paper bag. The controlling portion (the main controlling portion 1) generates the first image data with the set image information i9 and the second image data including the development 9 with tabs for sticking as the paper bag image data. The printing portion 5 performs printing on one surface of the paper sheet based on the first image data and performs printing on the other surface of the paper sheet based on the second image data. In this way, the user can set a desired design such as a pattern, a figure, and characters to be applied to the surface of the paper bag. Therefore the user can obtain the paper bag with a desired design. In addition, because the desired design such as a pattern, a figure, and characters (the image information i9) and the development 9 with tabs for sticking are printed on different surfaces, an appearance is not spoiled by the development 9 with tabs for sticking.

The receiving portion (the touch panel portion 42, hardware key 43) receives setting for determining the image information i9 for each surface of the paper bag. The controlling portion (the main controlling portion 1) generates the first image data with the image information i9 so that the set image information i9 is printed on the surface to which the image information i9 is set. In this way, the user can determine in detail the desired design such as a pattern, a figure, and characters (the image information i9) of the paper bag.

The image forming apparatus (the multifunction peripheral 100) includes the input portion (the communication portion 6a, the wireless communication portion 6b, the image reading portion 3) to which the image information i9 is input. The storage portion 2 accumulates the image information i9 input to the input portion. In this way, the user can add the image information i9 (image data) such as a favorite pattern, figure, character string (to be applied to the paper bag). Further, the user can obtain an intended paper bag using the added data.

The receiving portion (the touch panel portion 42, the hardware key 43) receive setting for adjusting a position of the image information i9. The controlling portion (the main controlling portion 1) generates the first image data with the image information i9 disposed at the position after the adjustment, as the paper bag image data. In this way, the desired pattern, figure, or character string can be disposed at the desired position. Therefore an intended paper bag can be obtained.

The controlling portion (the main controlling portion 1) recognizes the material to be housed as one hexahedron based on the image data of the one surface and the image data of the another surface, determines the width, depth, and height of the hexahedron, determines a length of the width of the hexahedron plus a predetermined first margin as the width of the paper bag, determines a length of the depth of the hexahedron plus a predetermined second margin as the depth of the paper bag, determines a length the height of the hexahedron plus a predetermined third margin as the height of the paper bag, generates the paper bag image data based on the determined width, depth, and height of the paper bag, determines the paper sheet size in which the generated paper bag image data can fit among paper sheets stored in the printing portion 5, and controls the printing portion 5 to perform printing on the paper sheet corresponding to the determined paper sheet size, based on the generated paper bag image data. In this way, it is possible to automatically generate the development 9 that is not tight for the material to be housed but has an allowance to some extent for housing the material to be housed. Therefore an easy-to-use paper bag can be obtained.

The receiving portion (the touch panel portion 42, the hardware key 43) receives the number of materials to be housed in the paper bag and the put-in way. The controlling portion (the main controlling portion 1) recognizes the material to be housed as a hexahedron based on the image data of the one surface and the image data of the another surface, recognizes the width, depth, and height of the hexahedron, recognizes the total width, total depth, and total height of the materials to be housed based on the set number of materials to be housed and the put-in way, determines a length of the total width plus a predetermined first margin as the width of the paper bag, determines a length of the total depth plus a predetermined second margin as the depth of the paper bag, determines a length of the total height plus a predetermined third margin as the height of the paper bag, generates the paper bag image data based on the determined width, depth, and height of the paper bag, determines the paper sheet size in which the generated paper bag image data can fit among paper sheets stored in the printing portion 5, and controls the printing portion 5 to perform printing on the paper sheet corresponding to the determined paper sheet size based on the generated paper bag image data. In this way, it is possible to automatically generate the development 9 that is not tight for the plurality of materials to be housed in the paper bag but has an allowance to some extent for housing the plurality of materials to be housed. Therefore it is possible to readily obtain the paper bag in which a plurality of materials to be housed can be put appropriately.

The image forming apparatus (multifunction peripheral 100) includes a display portion for displaying a completion preview image of the paper bag when the paper sheet printed based on the paper bag image data is assembled. In this way, a completion prognostic diagram can be checked before printing the paper bag image data. In addition, it can be checked that there is a setting error before printing the paper bag image data (development 9), and it is also possible to appropriately correct the setting. In addition, it is possible to prevent wasteful printing.

The image forming apparatus includes the retaining portion 7 for retaining the adhesive member 71 for adhering the tabs for sticking 91 provided to the paper sheet printed based on the paper bag image data. In this way, the paper bag can be promptly made (assembled) after printing the paper bag image data.

In addition, although the embodiment of the present disclosure is described above, the scope of the present disclosure is not limited to this. The present disclosure can be variously modified for implementation within the scope without deviating from the spirit of the disclosure.

What is claimed is:

1. An image forming apparatus comprising:
a printing portion for printing on a paper sheet;
a receiving portion for receiving settings;
an image reading portion for reading one surface and another surface connected to the one surface of a material to be housed in a paper bag, so as to generate image data of the one surface and image data of the another surface; and
a controlling portion configured to recognize a size of the material to be housed based on the image data of the one surface and the image data of the another surface, to generate paper bag image data that is image data of a development of the paper bag in which the entire of the material to be housed can fit, the development being with tabs for sticking for assembly, and to control the printing portion to print the development with tabs for sticking based on the paper bag image data.

2. The image forming apparatus according to claim 1, wherein
the receiving portion receives setting of weight of the material to be housed in the paper bag, and
the controlling portion generates the paper bag image data with the tabs for sticking having a larger width as the set weight is heavier.

3. The image forming apparatus according to claim 1, wherein
the receiving portion receives setting for determining the width of the tabs for sticking, and the controlling portion generates the paper bag image data with the tabs for sticking having a width corresponding to the setting.

4. The image forming apparatus according to claim 1, wherein
the receiving portion receives setting for determining a type of the paper bag, and
the controlling portion generates the paper bag image data corresponding to the set type of the paper bag.

5. The image forming apparatus according to claim 1, further comprising a storage portion for storing a plurality of types of image information to be printed on a surface of the paper bag, wherein
the receiving portion receives setting for determining the image information to be printed on the surface of the paper bag, and
the controlling portion generates a first image data with the set image information and a second image data including the development with tabs for sticking as the paper bag image data, controls the printing portion to perform printing on one surface of the paper sheet based on the first image data, and controls the printing portion to perform printing on the other surface of the paper sheet based on the second image data.

6. The image forming apparatus according to claim 5, wherein
the receiving portion receives setting for determining the image information for each surface of the paper bag, and
the controlling portion generates the first image data with the image information so that the set image information is printed on the surface to which the image information is set.

7. The image forming apparatus according to claim 5, further comprising an input portion to which the image information is input, wherein
the storage portion accumulates the image information input to the input portion.

8. The image forming apparatus according to claim 5, wherein
the receiving portion receives setting for adjusting a position of the image information, and
the controlling portion generates the first image data in which the image information is located at the position after the adjustment.

9. The image forming apparatus according to claim 1, wherein
the controlling portion recognizes the material to be housed as one hexahedron based on the image data of the one surface and the image data of the another surface, determines a width, depth, and height of the hexahedron, determines a length of the width of the hexahedron plus a predetermined first margin as a width of the paper bag, determines a length of the depth of the hexahedron plus a predetermined second margin as a depth of the paper bag, determines a length of the height of the hexahedron plus a predetermined third margin as a height of the paper bag, generates the paper bag image data based on the determined width, depth, and height of the paper bag, determines a paper sheet size in which the paper bag image data can fit among paper sheets stored in the printing portion, and controls the printing portion to perform printing on the paper sheet corresponding to the determined paper sheet size based on the generated paper bag image data.

10. The image forming apparatus according to claim 1, wherein
the receiving portion receives the number of materials to be housed in the paper bag and a put-in way of the same, and
the controlling portion recognizes the material to be housed as a hexahedron based on the image data of the one surface and the image data of the another surface, recognizes a width, depth, and height of the hexahedron, recognizes a total width, total depth, and total height of the materials to be housed based on the set number of materials to be housed and the put-in way, determines length of the total width plus a predetermined first margin as a width of the paper bag, determines a length of the total depth plus a predetermined second margin as a depth of the paper bag, determines a length of the total height plus a predetermined third margin as a height of the paper bag, generates the paper bag image data based on the determined width, depth, and height of the paper bag, determines a paper sheet size in which the generated paper bag image data can fit among paper sheets stored in the printing portion, and controls the printing portion to perform printing on the paper sheet corresponding to the determined paper sheet size based on the generated paper bag image data.

11. The image forming apparatus according to claim 1, further comprising a display portion for displaying a preview image, wherein
the controlling portion controls the display portion to display a completion preview image of the paper bag when the paper sheet printed based on the paper bag image data is assembled.

12. The image forming apparatus according to claim 1, further comprising a retaining portion for retaining an adhesive member for adhering the tabs for sticking provided to the paper sheet printed based on the paper bag image data.

13. The image forming apparatus according to claim 1, wherein when the controlling portion controls the printing portion to print the development with tabs for sticking, the controlling portion controls the printing portion to print an assembly illustration of the paper bag as an additional document.

14. The image forming apparatus according to claim 1, wherein the controlling portion controls the printing portion to print the development with tabs for sticking in which a cutoff line is a solid line, a folding line is a broken line, and the tabs for sticking are dot-meshed.

15. A method for controlling an image forming apparatus, the method comprising:
reading one surface and another surface connected to the one surface of a material to be housed in a paper bag;
generating image data of the one surface and image data of the another surface;
recognizing a size of the material to be housed based on the image data of the one surface and the image data of the another surface;
generating paper bag image data that is image data of a development of the paper bag in which the entire of the material to be housed can fit, the development being with tabs for sticking for assembly; and
printing the development with tabs for sticking based on the paper bag image data.

* * * * *